United States Patent [19]

Rivero-Olmedo

[11] Patent Number: 5,003,821
[45] Date of Patent: Apr. 2, 1991

[54] METER BOX OR METER YOKE EXPANSION MECHANISM

[76] Inventor: Jose M. Rivero-Olmedo, P.O. Box ER, Carolina, P.R. 00628

[21] Appl. No.: 444,977

[22] Filed: Dec. 4, 1989

Related U.S. Application Data

[63] Continuation-in-part of Ser. No. 328,226, Mar. 24, 1989, Pat. No. 4,884,442, which is a continuation of Ser. No. 251,987, Sep. 29, 1988, Pat. No. 4,872,338, and Ser. No. 170,644, Mar. 16, 1988, abandoned, which is a continuation of Ser. No. 816,903, Jan. 8, 1990, abandoned.

[51] Int. Cl.$^5$ .............................................. G01F 15/18
[52] U.S. Cl. ........................................ 73/201; 285/32
[58] Field of Search .................. 73/201, 272 R, 273; 285/32, 38

[56] References Cited

U.S. PATENT DOCUMENTS

| | | | |
|---|---|---|---|
| 1,301,244 | 4/1919 | Ford | 285/32 |
| 2,125,380 | 8/1938 | Krueger | 285/32 X |
| 2,359,846 | 10/1944 | Hayman | 285/32 |
| 2,484,755 | 10/1949 | Smith | 285/32 X |

*Primary Examiner*—Herbert Goldstein
*Attorney, Agent, or Firm*—Lalos & Keegan

[57] ABSTRACT

An expansion mechanism for use in a meter box or a meter yoke. The mechanism composed of two principal elements includes a body having an at least partially threaded axial body opening passing therethrough and a bushing having a nut with a threaded female portion into which the meter threads and a threaded male portion adapted to thread into the threaded body opening. A cup having a cup opening passing therethrough is secured to an annular rim on the interior of the body and is provided with a tubular surface axially aligned with the bushing and body. The cup is provided with a sleeve having an O-ring sealer that continuously provides a seal between the tubular surface and the bushing so that the seal is maintained in any relative axial position between the body and the bushing.

24 Claims, 2 Drawing Sheets

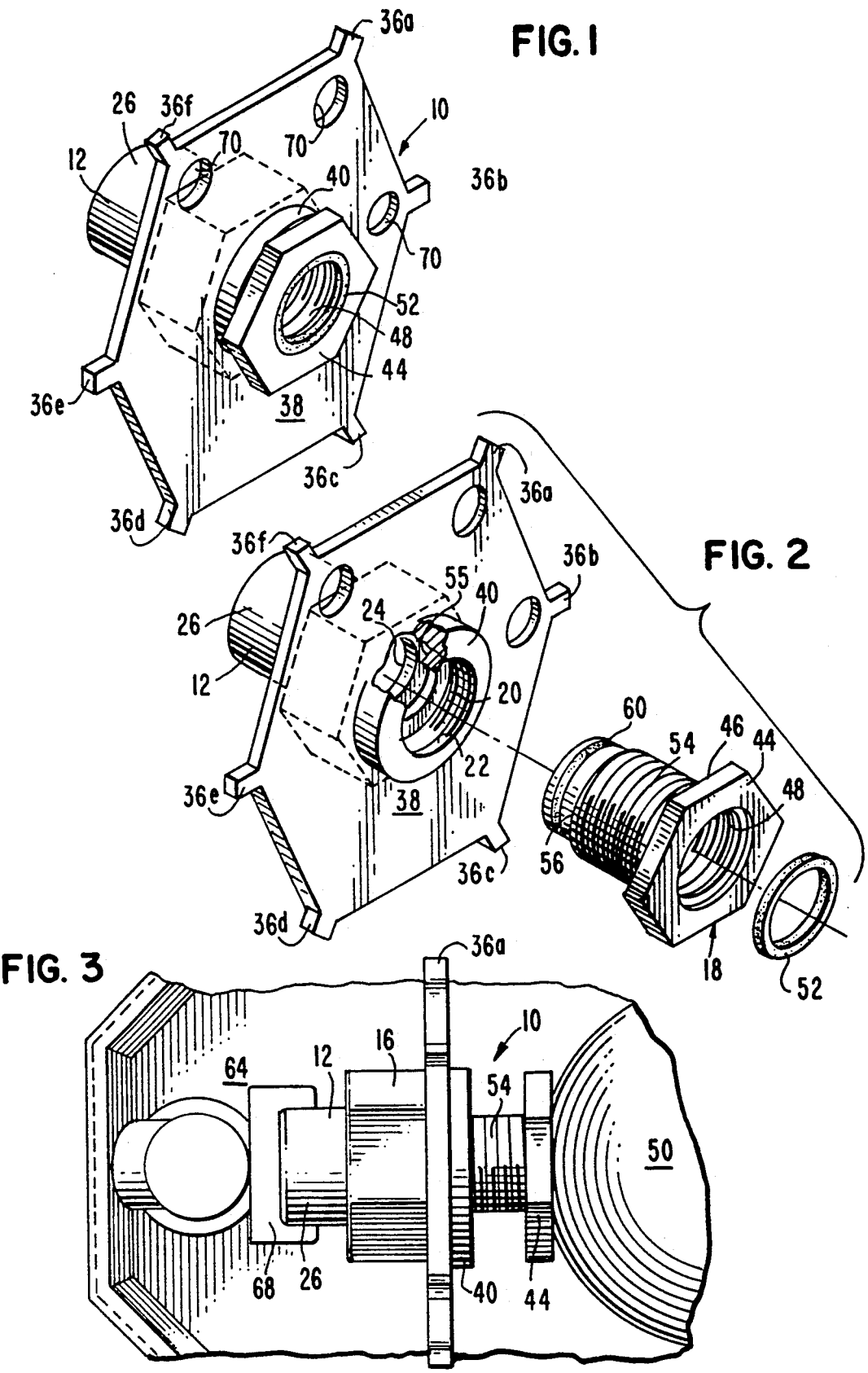

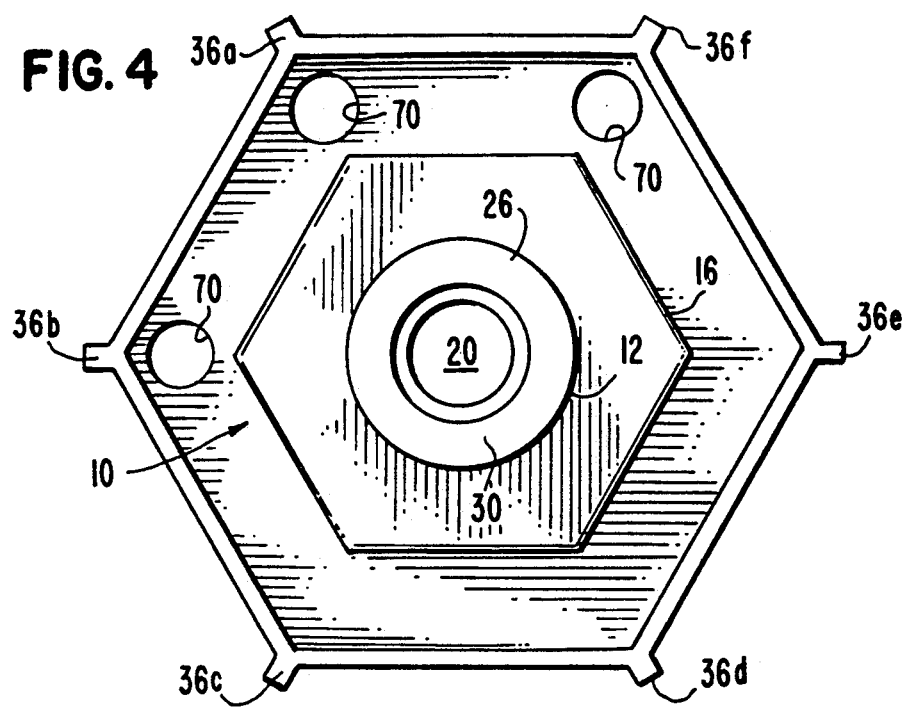
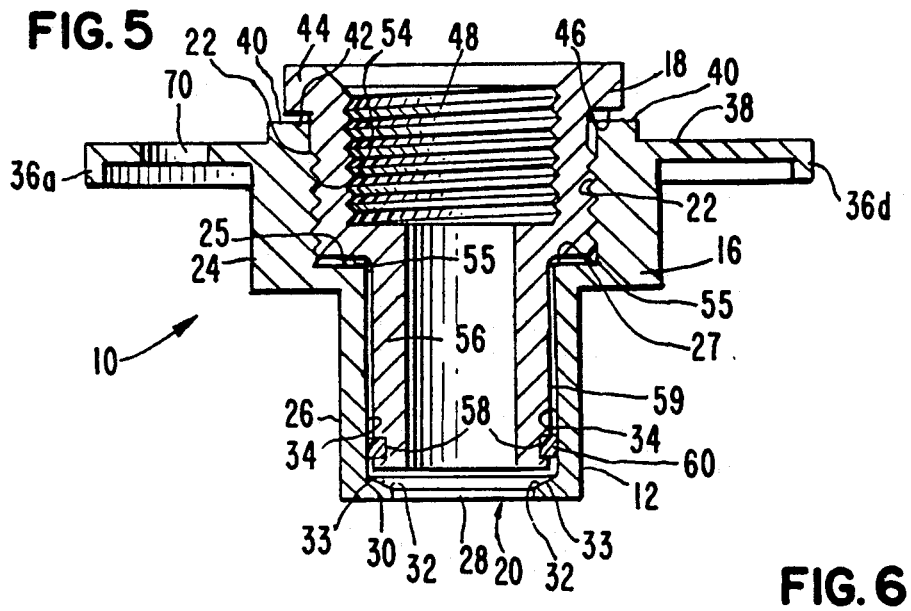
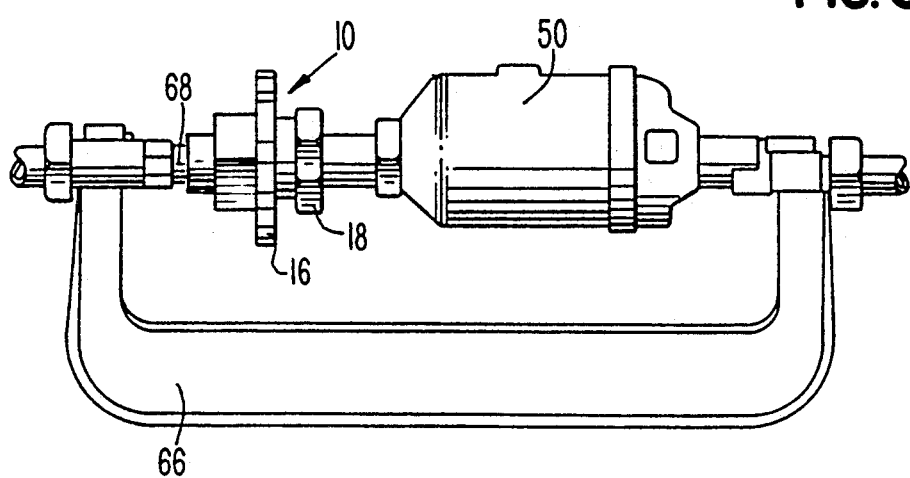

METER BOX OR METER YOKE EXPANSION MECHANISM

This is a continuation-in-part of copending application Ser. No. 328,226 filed on Mar. 24, 1989 to issue Dec. 5, 1989 as U.S. Pat. No. 4,884,442, which application is a continuation of application Ser. Nos. 251,987 filed on Sept. 29, 1988 now U.S. Pat. No. 4,872,338, and 170,644 filed on Mar. 16, 1988, all now abandoned which is a continuation of Ser. No. 816,013 filed Jan. 8, 1986, now abandoned.

BACKGROUND OF THE INVENTION

This invention relates to meter boxes and meter yokes. It more particularly relates to expansion mechanisms for mounting fluid meters in meter boxes and meter yokes.

In the past, the expansion mechanisms for liquid meters were manufactured of brass or bronze and included a cast brass or bronze body machined thereafter. These brass expansion mechanisms were mass produced at a very low cost. As a result, they were often considered expendible and the fact that they were wanting in any one of several respects was discounted due to their low cost. In situations where it was anticipated that these expansion mechanisms would fail for one reason or another, the general attitude of the art was to use them and plan to replace them when they failed.

One major shortcoming of these conventional expansion mechanism constructions was the fact that the metal was subject to being attacked or reduced by electrolytic action with resulting failure. While there are many situations where it is known that electrolytic action will or may be encountered and troublesome and oftentimes expensive efforts or steps can be made to overcome such actions, there are many other situations where it is not expected. Further, the magnitude of such action and the part or parts of the expansion mechanism construction that will be attacked by it are seldom determinable. Thus, the effective life of the expansion mechanism and meter can seldom, if ever, be determined.

Another major shortcoming of the brass expansion mechanism is that the cast portion thereof is frequently replete with holes and cavities as a result of impurities and the like in the metal. Such defects in the casting are seldom visible and frequently and unexpectedly result in ruptures, leaks and the like when the expansion mechanisms are in use.

Another shortcoming is the fact that brass and bronze have a relatively high coefficient of friction with water and certain other fluids. As a result, brass or bronze plug expansion mechanisms create a substantial resistance to fluid flow through them. These expansion mechanisms also have a number of separate parts in which cracks and crevices are defined and in which foreign matters can lodge.

Also, the arrangement used to hold the cup of the expansion mechanism to the main body was not sufficient to avoid the loss of the cup and also at the same time to prevent leaks between the main body and the cup.

Further, the main body of conventional mechanisms has a hand wheel in a star shape that makes it difficult to turn inside of a meter box in which there is limited space available between the walls of the box and the diameter of the hand wheel. Thus, frequently the person who installs the meter does not have enough clearance to turn the wheel sufficiently, and a seal is not thereby effected at the end of the fitting and leaking occurs.

In my prior designs, now recently patented, these deficiencies of the previous prior art were overcome. However, there were two additional shortcomings inherent in my prior designs.

First, there were too many parts that would be used to make up a complete working expansion mechanism. For instance, the cup and gasket were each a separate element that would bring additional costs to the manufacturing process and would require stocking of these separate elements for maintenance purposes.

Second, the seal derived from my prior expansion mechanisms required the gasket to be deformed by rotating the hand wheel until the top of gasket abutted the under surface of the annular rim. Until this contact occurred, there would be an insufficient seal that would permit leaking. Such a construction limited my prior design to full sealing contact only when the hand wheel was fully adjusted to bring about this sealing contact. Any unadjusted position therefore would be without full sealing contact.

OBJECTS OF THE INVENTION

Accordingly, it is the principal object of the present invention to provide an improved expansion mechanism for meter boxes and meter yokes.

Another object of the present invention is to provide a novel expansion mechanism which is adjusted without the use of wrenches or tools.

A still further object of the present invention is to provide an improved expansion mechanism which maintains a continuous seal during any necessary adjustments.

Another object is to provide an improved expansion mechanism which continuously prevents leaks between the main body and the expansion mechanism cup.

A further object is to provide an improved expansion mechanism which eliminates leaking between the meter and the adjacent connecting fittings.

A still further object is to provide an improved expansion mechanism formed of plaster which is less likely to be attached or reduced by electrolytic action.

Another object is to provide an improved expansion mechanism which is less likely to rupture or leak.

A further object is to provide an improved expansion mechanism which reduces the resistance to flow through the mechanism.

A still further object is to provide a novel expansion mechanism which is lightweight and has fewer parts.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of an expansion mechanism of the present invention.

FIG. 2 is a perspective view of the expansion mechanism of FIG. 1 with the parts thereof illustrated in exploded relation.

FIG. 3 is a top plan view of the expansion mechanism of FIG. 1 shown installed in a meter box.

FIG. 4 is an end view of the body of the expansion mechanism of FIG. 1.

FIG. 5 is a longitudinal cross-sectional view of the expansion mechanism of FIG. 1.

FIG. 6 is a side plan view of the expansion mechanism of FIG. 1 shown installed in a meter yoke.

DETAILED DESCRIPTION OF THE PREFERRED EMBODIMENT

An expansion mechanism of the present invention is illustrated in the drawings generally at 10. It is shown to comprise three basic parts: a cup 12 is formed integrally with a body or hand wheel 16 to form a single part and a bushing 18 forming the other part. These two parts are shown in exploded relation for clarity in FIG. 2 and in a cut away assembled view in FIG. 5.

Body 16 has a body opening 20 passing axially through it. Opening 20 has threads 22 extending only a portion of its entire length, as illustrated in FIG. 5, and an annular rim 24 positioned below the threads 22 to provide a radially extending platform 25. Secured to and extending axially longitudinally from the annular rim 24 below platform 25 is the cup 12 having a cylindrical outer surface 26 of lesser diameter than the threads 22 to thereby form a limit surface 27 perpendicular to the axis of opening 20. The cup 12 is provided with a bottom opening 28 formed with an inwardly protruding lip 30 establishing an abutting surface 32 that is bevelled downwardly and inwardly at the radially innermost circumference to form a chamfered edge 33. The abutting surface 32 meets a tubular surface or bore 34 forming the inner surface.

Body 16 further has six evenly spaced spokes 36a, 36b, 36c, 36d, 36e and 36f projecting radially outwardly from base 38. Base 38 is provided with a collar 40 surrounding the opening 20 and extending slightly above the base 38 as shown in FIG. 5, to form an abutment 42.

The user can easily and effectively turn body 16 relative to bushing 18 to seal expansion mechanism 10 to the adjacent structure by inserting his fingers between the spokes and onto the sides of the spokes or between them and then turning them. This spoke design allows the body to be completely turned even in constricted spaces such as in meter boxes and to be safely turned without the risk of cutting the fingers of the installing personnel.

Bushing 18 has a nut 44 at one end and a lower surface 46 for limiting axial movement beyond abutment 42. A threaded opening 48 in the bushing 18 is provided to permit the bushing 18 to be screwed onto the male threaded member of meter 50. A gasket 52 is positioned adjacent the nut to define a seal. Adjacent nut 44, bushing 18 has an outer threaded portion 54 and a portion of reduced diameter compared to threads 54 forming a shoulder 55 to serve as a stop limit and a tubular portion forming a sleeve 56 extending axially therefrom as best shown in FIGS. 2 and 5. Sleeve 56 is provided with a groove 58 circumferentially disposed about its tubular surface 59 toward the distal end of the sleeve. A sealer, preferably in the form of an O-ring 60, is positioned within the groove 58 to extend radially beyond the tubular surface 59 of the sleeve 56.

Cup 12, in accordance with the present invention, is integral with body 16 and is prepared telescopically to receive sleeve 56 in a sealing relationship. Sleeve 56 is positioned into body opening 20 and threaded portion 54 turned by hand wheel 16 so that it threads into body threads 22. As can be appreciated from FIG. 5, sleeve 56 will then extend into the cup opening 12 where the sealer in the form of O-ring 60 is in continuous sealing and sliding contact with the tubular surface or bore 34 and will continuously provide an adequate seal to prevent passage of liquid through the expansion mechanism of the present invention. As lower surface 46 of the nut 44 limits the axial movement of the bushing 18 and therefore the sleeve 56 by striking the abutment 42, so the limit surface 27 of the platform 25 limits the telescopic axial movement of the bushing 18 into the body 16 by striking the limit stop on the shoulder 55 of the bushing 18. However, no matter where the body 16 is axially positioned along the bushing 18 through movement of the spokes of the hand wheel, the O-ring sealer 60 provides a continuous seal between the two parts, i.e. the body 16 and bushing 18, of the present invention.

Expansion mechanism 10 is first screwed via nut 44 and threads 48 onto meter 50. The meter and expansion mechanism are then fitted into a meter box 64 as shown in part in FIG. 3 or in a meter yoke 66 as shown in FIG. 6. An example of a meter box construction is shown in U.S. Pat. No. 3,212,339. Cup 12 is fitted in connecting fitting 68. By manually turning body 16 via spokes 36a-36f, the body 16 moves axially along the stationary bushing 18 in a continuous seal. Expansion mechanism 10 is also sealed to connecting fitting 68 in a conventional manner. Body 16 is then secured from further rotation from its desired position by passing a wire (not shown) through one of the openings 70 positioned in one of the spokes and securing the wire to a stationary object adjacent to the body 16.

Cup 12, body 16 and bushing 18 are each preferably formed of plastic, for example, any engineering resilient plastic material such as the preferable acetals. Other suitable plastics may include ABS, polyethers, fluorocarbons, nylons, phenolics, polypropylenes and the like.

Plastics have a lower coefficient of friction with fluids, e.g. water, than does brass or bronze. Thus, there will be less resistance to flow with expansion mechanism 10 than conventional mechanisms and a greater flow through can be obtained. Forming the expansion mechanism of unitary plastic parts provides a sanitary, non-oxidizing and non-contaminating mechanism having a minimum number of separate parts in whose cracks and crevices foreign matter can lodge. Also, since it is formed of a dielectric material, it will not create or be affected by electrolytic action.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An expansion mechanism for connecting a meter within a meter box or yoke, comprising:

a hand wheel having a partially threaded axial opening therethrough with an annular rim extending inwardly into said axial opening, said annular rim having an annular surface;

a bushing having a threaded portion cooperating with said partially threaded axial opening in said hand wheel, a sleeve depending from said bushing for axial movement about said annular surface of said annular rim, and means for operatively connecting said bushing to a conduit;

a cup having a tubular surface with an opening at an opposite end thereof and being secured to said annular rim, said tubular surface extending longitudinally from said annular rim; and an annular gasket positioned about said sleeve for movement with said sleeve whereby threaded movement between said hand wheel and said bushing moves said gasket in continuous sealing engagement axially along said tubular surface.

2. An expansion mechanism according to claim 1, wherein said hand wheel includes a radially outwardly extending gripping element.

3. An expansion mechanism according to claim 2, wherein said hand gripping element is positioned at an axial distance from said annular rim.

4. An expansion mechanism according to claim 3, wherein said hand gripping element is positioned at approximately the same axial location as threads of said partially threaded opening through said hand wheel.

5. An expansion mechanism according to claim 1, wherein said means for operatively connecting a conduit comprises an at least partially threaded axial opening through said bushing.

6. An expansion mechanism according to claim 5, wherein threads of said at least partially threaded axial opening through said bushing at least partially overlap in the axial direction with said outer threaded portion of said bushing.

7. An expansion mechanism according to claim 1, wherein said annular gasket is an O-ring on said sleeve to permit continuous sealing engagement with said tubular surface.

8. An expansion mechanism according to claim 7, wherein said sleeve includes a circumferential groove for receiving said O-ring.

9. An expansion mechanism according to claim 8, wherein said tubular surface received therewithin said sleeve for longitudinal axial movement and continuous sealing engagement therebetween.

10. An expansion mechanism according to claim 1, wherein said tubular surface being integral with said annular rim and a chamfered edge formed at the junction of said tubular surface and said annular rim.

11. An expansion mechanism according to claim 1, wherein said hand wheel, bushing and cup are formed of plastic.

12. An expansion mechanism according to claim 11, wherein said plastic comprises an acetal copolymer.

13. An expansion mechanism according to claim 2, wherein said gripping element includes circumferentially spaced apart spokes extending generally radially outwardly.

14. An expansion mechanism according to claim 13, wherein at least three of said spokes have openings adjacent thereto through which a wire seal can be passed.

15. An expansion mechanism according to claim 1, wherein said annular gasket is an O-ring on said sleeve to permit continuous sealing engagement with said tubular surface, said sleeve includes a circumferential groove for receiving said O-ring, and said tubular surface being integral with said annular rim and a chamfered edge formed at the junction of said tubular surface and said annular rim.

16. An expansion mechanism according to claim 1, wherein said annular gasket is formed of rubber.

17. An expansion mechanism according to claim 1, wherein said annular gasket is an O-ring on said sleeve to permit continuous sealing engagement with said tubular surface, said sleeve includes a circumferential groove for receiving said O-ring, said tubular surface receives therewithin said sleeve for longitudinal axial movement and continuous sealing engagement therebetween, and said tubular surface being integral with said annular rim and a chamfered edge formed at the junction of said tubular surface and said annular rim.

18. An expansion mechanism for connecting a meter within a meter box or yoke, comprising:

a hand wheel having a partially threaded axial opening therethrough with an annular rim extending inwardly into said axial opening, said annular rim having an annular surface with a diameter less than a diameter of said axial opening through said hand wheel;

a bushing having an outer threaded portion cooperating with said partially threaded axial opening in said hand wheel, a sleeve depending from said bushing for axial movement through said annular surface of said annular rim, and means for operatively connecting said bushing to a conduit;

a cup having a bore with an opening at an opposite end thereof and being secured to said annular rim, said bore extending longitudinally from said annular rim; and an annular gasket positioned about said sleeve for movement with said sleeve whereby threaded movement between said hand wheel and said bushing moves said gasket in continuous sealing engagement axially along said bore.

19. An expansion mechanism according to claim 18, wherein said annular gasket is an O-ring on said sleeve to permit continuous sealing engagement with said bore.

20. An expansion mechanism according to claim 19, wherein said sleeve includes a circumferential groove for receiving said O-ring.

21. An expansion mechanism according to claim 20, wherein said bore receives therewithin said sleeve for longitudinal axial movement and continuous sealing engagement therebetween.

22. An expansion mechanism according to claim 18, wherein said bore being integral with said annular rim and a chamfered edge formed at the junction of said bore and said annular rim.

23. An expansion mechanism according to claim 18, wherein said annular gasket is an O-ring on said sleeve to permit continuous sealing engagement with said bore, said sleeve includes a circumferential groove for receiving said O-ring, and said bore being integral with said annular rim and a chamfered edge formed at the junction of said bore and said annular rim.

24. An expansion mechanism according to claim 18, wherein said annular gasket is an O-ring on said sleeve to permit continuous sealing engagement with said bore, said sleeve includes a circumferential groove for receiving said O-ring, said bore receives therewithin said sleeve for longitudinal axial movement and continuous sealing engagement therebetween, and said bore being integral with said annular rim and a chamfered edge formed at the junction of said bore and said annular rim.

* * * * *